May 28, 1940.  C. J. HAYNES  2,202,656
WELL-LOGGING ELECTRODE
Filed July 15, 1938
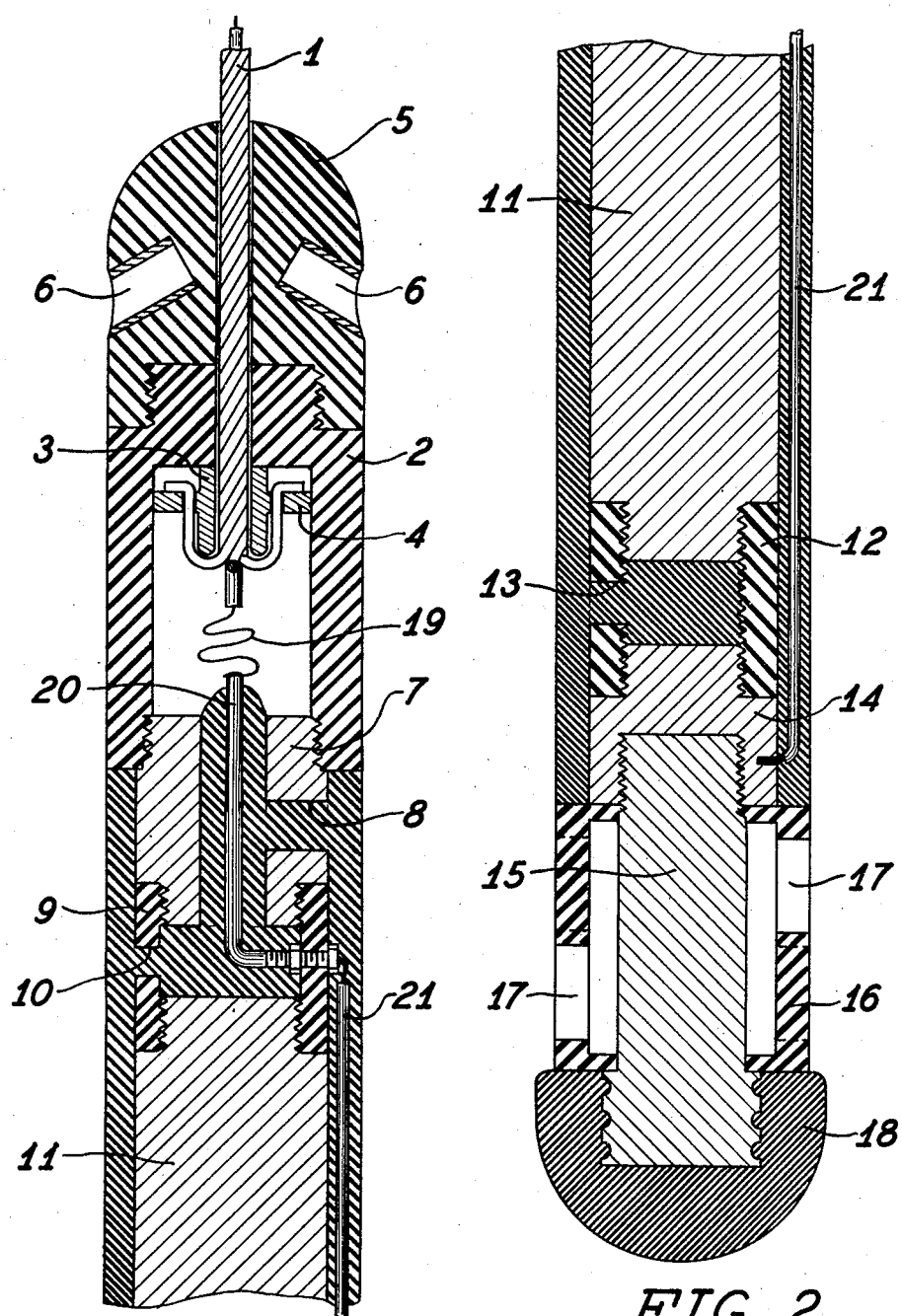
FIG_1_
FIG_2_
INVENTOR.
Cecil J. Haynes
BY W. E. Currie
ATTORNEY.

Patented May 28, 1940

2,202,656

UNITED STATES PATENT OFFICE 2,202,656

WELL-LOGGING ELECTRODE

Cecil J. Haynes, Houston, Tex., assignor to Standard Oil Development Company, a corporation of Delaware Application July 15, 1938, Serial No. 219,304

9 Claims. (Cl. 175—182)

The present invention is directed to an electrode structure for use in the logging of boreholes through the earth.

In electrical well-logging, as it is practised for the determination of the nature of substrata traversed by boreholes in the drilling of oil wells and wells of other types, the measurements made must be extremely accurate because the values measured are small. In the early practise of this method it was found that many irregularities difficult to explain appeared on the records obtained. In some cases indications which were relied upon to represent oil sands were found at depths at which it was known that no oil sand existed. Such occurrences made these records somewhat unreliable.

The present invention is directed to an electrode in the utilization of which many of the irregularities previously experienced have been eliminated and, incidentally, the reason for their occurrence explained. For example, one of the features of the electrode of the present invention is the screening of the actual exploring tip of the electrode from contact with the walls of the borehole. This construction resulted in a considerable improvement in the records produced and indicated that some of the irregularities occurring in past records were the result of a metal-to-formation potential set up when the exploring tip touched the walls of the borehole.

It is customary to include in electrodes of this type a large mass of metal which is used for weighting purposes. In some cases one portion of the electrode is hollow and contains electrical apparatus, such as vacuum tubes and the like, which are used for amplifying and other purposes. A feature of the present invention is the encasement of the weighting mass and/or the hollow chamber, as the case may be, in a tight fitting sheath of vulcanized rubber which, in the preferred form, is vulcanized in situ. It has been found that the adoption of this expedient has also resulted in a further improvement in the records produced. This led to the conclusion that some of the undesirable features of records previously produced were due to leakage between the exploring tip and the weighting mass, and, in the case of electrodes carrying delicate electrical equipment, to microphonic effects resulting from the bumping of the electrode against the walls of the borehole. It may be pointed out here that previous attempts were made to insulate the exploring tip from the weighting mass, but it has now become apparent that insulating material other than vulcanized rubber can be penetrated by water at the high temperatures and extremely high pressures encountered in deep boreholes, thereby accounting for the failure of these materials to overcome the undesirable leakage.

Other objects and advantages of the present invention will appear from the following detailed description of the accompanying drawing in which—

Figure 1 is a vertical section of the upper half of an electrode according to the present invention; and Figure 2 is a vertical section of the lower half of the same electrode.

Referring to the drawing in particular, the electrode is hung on a cable 1 which is provided with an armor composed of several strands of wire and carries a conductor in its middle. This cable extends down into the interior of a cylinder 2 of Bakelite or other similar material in which is fastened a locking member 3 for receiving the strands of the cable, composed of a cylinder having a disc member 4 provided with perforations for receiving individual strands of the armor. Screwed onto the upper end of cylinder 4 is a block 5 of Bakelite, or similar material, provided with upwardly inclined recesses 6 for the reception of a fishing tool or a lifting means.

Into the lower end of cylinder 2 is screwed a coupling member 7 which is hollow and is provided on one of its sides with an opening 8 for the purpose hereinafter specified. Connected to the lower end of the coupling is a sleeve 9 also provided on one of its sides with an opening 10 and connected at its other end with a mass 11 of heavy metal.

The lower end of the mass 11 also carries a coupling 12 which is provided with a transverse opening 13 and is connected at its lower end with a metal block 14 into which is screwed a ballast metal cylinder 15 which is the electrode proper. Mounted on the electrode 15 is a cage 16 of Bakelite or similar material which is provided with slots 17 of any desired configuration, to allow the passage of fluid into the electrode. A cap 18 of rubber, Bakelite, or other similar material is screwed onto the lower end of electrode 15. If desired, this cap may be coated with metal for spudding purposes.

In the manufacture of this electrode the parts enumerated are assembled as shown in the drawing with a space between coupling 7 and mass 11 and a space between mass 11 and block 14.

The conductor 19 of the cable is soldered to one end of an L shaped metal rod 20, the other end of which passes through the wall of sleeve 9 in screw threaded connection therewith, and is connected to an insulated wire 21 which is arranged parallel with the exterior surface of mass 11 and is soldered at its lower end to block 14.

With the parts assembled as shown in the drawing, cylinder 2 is unscrewed from the remainder of the assembly and the remainder is laid in a suitable mold into which is poured a melt of rubber containing the conventional vulcanizing agents. The melt fills the spaces between coupling 7 and mass 11 and between mass 11 and block 14, and also fills the central opening of coupling 7 as shown. The mass is then vulcanized producing the body shown in the drawing. Upon completion of the vulcanization the cylinder 2 is screwed back in place and the electrode is completed.

It will be seen that in the resulting electrode the weight 11 is completely insulated from the exploring electrode 15 in such a fashion that no possible leakage of water can occur from the borehole to the weight and, therefore, no leakage of current can occur from the electrode to the weight. Vulcanized rubber is impermeable to water even at the high temperatures and pressures encountered in boreholes, and has the added advantage that these high pressures make an even closer fit between the rubber and the metal. In addition, in case the electrode is of the type in which electrical apparatus, such as vacuum tubes, are included, the rubber prevents any microphonic effects from occurring by reason of the electrode striking against the walls of the borehole.

Another important feature of the construction of this electrode is the shielding of the exploring surface 15 from the walls of the borehole. It may be noted here that contact between the exploring surface and the borehole wall could be prevented by simply making the exploring surface of small diameter as shown in the drawing. This would result, however, in the presence of sharp shoulders on the surface of the electrode which would tend to engage any irregularities in the borehole wall and hang the electrode. This is avoided by providing the perforated cage 16 which keeps the diameter of the electrode uniform over its entire length.

It will be apparent that changes may be made in the construction described above without departing from the essential principles embodied therein. All such changes are contemplated within the scope of the appended claims in which it is intended to claim the present invention as broadly as the prior art permits.

I claim:

1. An electrode for borehole logging comprising an elongated body of substantially uniform diameter throughout its length having a surface composed of electrical insulating material and having a section of its surface intermediate its ends perforated, a body of electrically conductive material of reduced cross sectional area mounted inside said perforated section and insulated from the remainder of said elongated body, a cable for suspending said elongated body in the borehole and a conductor carried by said cable and connected to said electrically conductive body.

2. An electrode for borehole logging comprising an elongated body having one portion of its length composed of a mass of heavy metal and having a separate portion of reduced diameter composed of an electrically conductive material, electrical insulation between said portions, a cage of insulating material surrounding said portion of reduced diameter, a cable for suspending said elongated body in the borehole, and a conductor carried by said cable and connected to said electrically conductive portion.

3. An electrode for borehole logging comprising an elongated body having a considerable portion of its length intermediate its ends composed of a metal body, a layer of rubber vulcanized in situ on said metal body, an electrically conductive body arranged in alignment with said metal body and having a smaller cross sectional area than said metal body, means for insulating said electrically conductive body from said metal body, a cable for suspending said elongated body in the borehole, and a conductor carried by said cable and connected to said electrically conductive body.

4. An electrode, according to the preceding claim, in which the electrically conductive body is surrounded by a cage of insulating material, said cage having its outer surface coextensive with the outer surface of said rubber layer.

5. An electrode, according to claim 3, in which the lower end of the electrically conductive body is provided with a nose of insulating material, said nose having a greater cross sectional area than said electrically conductive body.

6. An electrode, according to claim 3, in which the conductor connected to the electrically conductive body is embedded in the rubber layer.

7. An electrode, according to claim 3, in which the electrically conductive body is surrounded by a cage of insulating material having its outer surface coextensive with the outer surface of the rubber layer and the lower end of the electrically conductive body is provided with a nose of insulating material, said nose having a larger cross sectional area than the electrically conductive body.

8. An electrode assembly adapted for use in electrical well-logging operations, said assembly including an electrode, a heavy metallic weight member, means for insulating and mechanically connecting the weight member from and to the electrode and sheathing means for sealing the insulating and connecting means to prevent moisture from the fluids in a well from coming in contact therewith.

9. An electrode for borehole logging comprising an elongated body having a considerable portion of its length intermediate its ends composed of a metal body, an exposed electrically conductive body arranged below said metal body and insulated therefrom, a head carried by said metal body adapted to provide an anchor for a cable carrying a conductor, a layer of rubber vulcanized in situ on said metal body and a conductor embedded in said rubber connecting said exposed conductive body to the conductor in said cable.

CECIL J. HAYNES.